Figure 1:
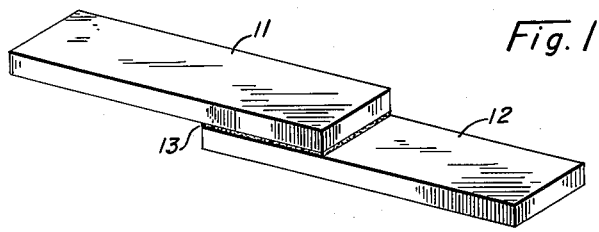

July 25, 1961  M. MENDELSOHN  2,993,826

SURFACE CONDITIONERS FOR NYLON

Filed March 8, 1956

INVENTOR.
MEYER MENDELSOHN

BY *Ely Silverman*

ATTORNEY 2,993,826
SURFACE CONDITIONERS FOR NYLON
Meyer Mendelsohn, New York, N.Y., assignor, by mesne assignments, to Yardney International Corp., New York, N.Y., a corporation of New York
Filed Mar. 8, 1956, Ser. No. 570,406
4 Claims. (Cl. 154—140)

This invention relates to discoveries and to improvements in bonding agents and surface treatment agents for surfaces of polyamide plastic bodies, such as commercial nylons. This application is a continuation-in-part of my copending application Serial No. 532,786, filed September 6, 1955, now abandoned.

The commercial nylons treated by my herein disclosed invention are, for example, synthetic linear condensation polyamide polymers capable of being drawn into pliable strong fibers showing characteristic X-ray patterns, orientation along the fiber axis, and are obtained by condensation reaction between bifunctional compounds having an average molecular weight not less than 10,000. Their manufacture is, for example, described in U.S. Patent No. 2,130,948.

A general object of the present invention is to provide novel methods of and means for conditioning the surfaces of relatively chemically inert organic materials, so as to render them receptive to bonding or cementing, dyeing, and coating agents including metallic surfaces.

A more specific object of the present invention is to provide novel reactive mixtures adapted to serve as bonding and filling agents for polyamide plastic bodies of high tensile strength.

A further object of the present invention is to provide novel reactive mixtures adapted to serve as bonding agents for high molecular weight polyamide materials without requiring curing at elevated temperatures, without requiring close machining of the surfaces to be bonded, and without requiring jigs to hold together under high pressures the surfaces to be joined.

A further object is to provide processes for bonding high tensile strength polyamide bodies at normal temperatures (20°–30° C.).

Previous cements and bonding agents for the high tensile strength (8,000 to 12,000 p.s.i. tensile strength) polyamides known as "nylons" have been unable to conveniently produce a homogeneous bond of high tensile strength between continuous masses of such nylons which were desired to be joined. "Filling in" of the spaces between such masses was needed to produce a homogeneous bond. Prior cements intended for such result were not able to fill in spaces between surfaces of such masses unless those surfaces were exactly matched or closely machined. Such previous cements relied substantially entirely on the solvent action of a liquid, such as hot phenol, that attacked and dissolved the nylon material locally.

Polyamide materials of high tensile strength as made from hexamethylenediammonium adipate (as by the process shown in Example II of the aforesaid U.S. Patent No. 2,130,948) and known as "Nylon 66" are of high molecular weight (about 9,000 to 13,000) and are generally highly resistant to action by ordinary solvents. They are also of low solubility in formic acid and phenol. These latter solvent liquors dissolve at temperatures comfortable to humans (20°–30° C.) only a very small portion of each opposing surface of the to-be-joined nylon bodies and, therefore, can provide only a very small volume of solid bridging material therebetween.

Such a proportion of each opposing surface of the to-be-joined nylon bodies, therefore, provides only a small volume of solid bridging material therebetween. Also, a bond as could be developed by these cements between the joined bodies would depend only on relatively few and narrow point-to-point bonds between adjacent opposing points of roughly machined parts.

Even careful matching by close-tolerance machining on the to-be-joined nylon surface was of no particular avail, although close machining permitted more numerous bonding points with less distance therebetween on opposing faces of to-be-joined surfaces and provided, therefore, more area of bond for a given mass of bridging material. Furthermore, the requirement of close machining is expensive and unsuitable for many types and shapes of nylon junctures.

Preparation of liquors of adequately high concentrations of high tensile strength polyamide materials which material could provide sufficiently more bridging material to adequately strongly bind adjacent polyamide surfaces requires high temperatures of highly reactive solvents, such as phenol and similar toxic organic acids, at say 80°–90° C. or higher temperatures, which solvents are then dangerously toxic and inconvenient to work with. Only such solutions could carry in solution a sufficient amount of high molecular weight, high tensile strength polyamide material with which to provide massive homogeneous bonds of useful strength extending between substantially the entire opposing surfaces of the high tensile strength high molecular weight polyamide surfaces to be bonded, when the surfaces of the pieces to be joined were separated by any appreciable space, e.g. $\frac{1}{16}$ of an inch. Further, even at such temperatures the resultant bond was not better than 10% of the full tensile strength of the joined polyamide bodies.

Heretofore, also, the use of elevated temperatures and pressures did away with any hope of forming an assembly of high tensile strength polyamide masses of predetermined overall dimensions due to a lack of control of the dimensions of the volume of the bond between the joined members. Also, it was expensive in practice and so inconvenient and unreliable were bonds formed by such materials that polyamide masses have been conventionally joined by nuts and bolts or rivets, with gaskets to provide leak-proof junctures.

While conventional polyamides of low molecular weight are readily soluble in commercial organic solvents, such as low-carbon alcohols, the polyamide residues remaining on removal of solvents therefore also are of such low molecular weight and have no useful tensile strength as needed in a bonding agent.

I have discovered that certain multi-ingredient polyamides, such as multi-ingredient copolymeric polyamides, formed from hexamethylene diammonium adipate, hexamethylenediammonium sebacate, and epsilon aminocaproic acid, hereinafter referred to as 66/610/6 polyamides, form bonds of highly satisfactory strengths between polyamides of high tensile strength, such as the polyamides formed from hexamethylene diammonium adipate, and these bonds are readily formed at 20°–30° C. These multi-ingredient polyamides have a substantial molecular weight (above 4,000) and are of high strength in the solid state. However, because of a minimum melting point and ready solubility in commercial solvents, these multi-ingredient polymers form stable highly concentrated solutions in commercial organic solvents, such as low-carbon alcohols, at convenient working temperatures, such as 20°–30° C.

Further still, in these compositions of multi-ingredient polyamides useful as a component of a reactive mixture useful as a bonding agent, one of the materials forming the 66/610/6 polymer in the above-mentioned case, which component is needed to obtain the ready solubility of the entire composition of the 66/610/6 copolymer in commercial solvents, is believed to be largely consumed in an interaction with the mass of high tensile strength polyamide which, in an example hereinbelow disclosed, contains an excess of free amine groups.

In accordance with the present invention, by the use of these multi-ingredient copolymers, highly concentrated polyamide liquors and solutions capable of completely and evenly filling-in spaces (even between roughly machined polyamide bodies) are readily obtained even at 20°–30° C. These highly concentrated liquors and solutions, on removal of the solvent, provide a large amount of a high molecular weight polyamide material of high tensile strength between and firmly bonded to the to-be-joined bodies of high tensile strength polyamide material.

Figure 2:
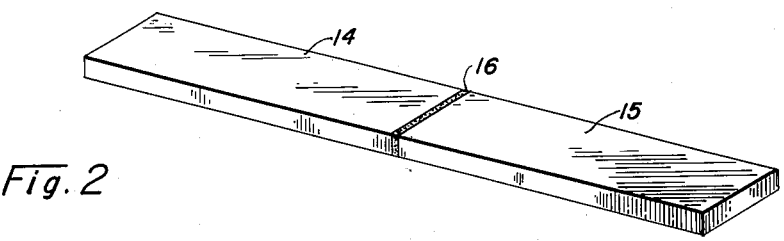
Figure 3:
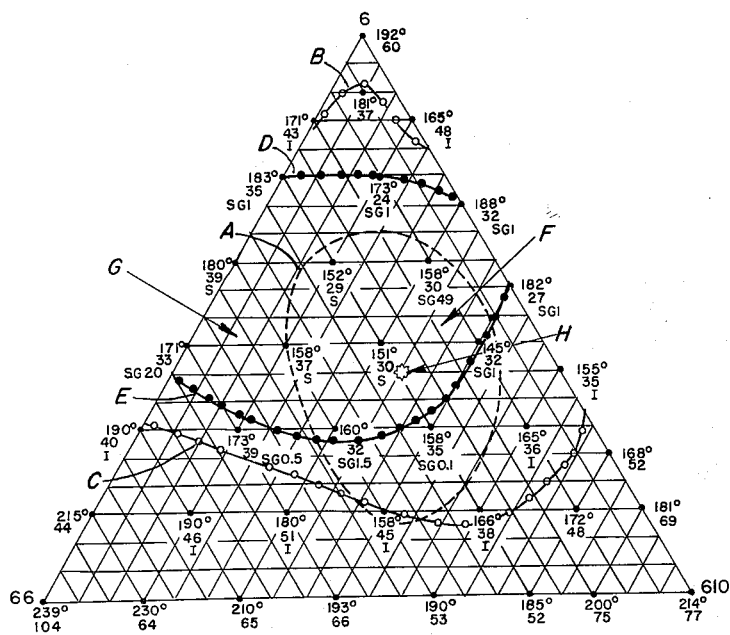

For a more complete understanding of the objects, operations, methods and results of the present invention, the following detailed disclosure is made, with reference to the drawing, in which:

FIG. 1 shows a lap joint between bodies of high tensile strength polyamide masses. Cements of the instant invention form the connecting bond for this joint;

FIG. 2 shows a butt joint using the invention cements between bodies of high tensile strength polyamide masses bonded together by the cements of the instant invention; and FIG. 3 is a ternary diagram showing the relations of weight ratios, by percent of components, used in preparing a polyamide composition which is a component of the cements of the present invention, to other properties of that composition which is also termed the 66/610/6 polyamides in this application.

One embodiment of the invention comprises a process for joining masses of polyamide materials of high tensile strength using two liquors. This process comprises treating each of the to-be-joined relatively insoluble polymer body surfaces (nylons) at room temperatures (e.g. 20°–30° C.), with a first treatment agent comprising a liquor, such as formic acid, capable of penetrating the polymer body to a finite depth, and thereby making the treated polymer surface zone swell and soften. This action provides a layer that is permeable to a second liquor and prepared for reaction with solutes carried in the second liquor. The second liquor carries a high concentration of a suitable high molecular weight but soluble polyamide as a 66/610/6 polyamide. The second liquor is applied to the layers produced by the action of the first liquor on the polyamide surfaces. The surfaces thus treated by first and second liquors are held in firm close contact with each other. Contact pressures of 1 to 5 p.s.i. are entirely adequate. Depending on the ambient temperature, the time needed for contact of the pieces varies, as described below. There results from the action of the first and second liquors a solid bonding layer of high tensile strength binding together the nylon bodies treated by the first and second liquor or "two-liquor" process herein broadly described.

The first liquor of the two-liquor process is chosen to have the capacity not only to attack a highly chemically resistant surface of a polyamide of high molecular weight such as that of the polymers of approximately equal molecular parts approximately of hexamethylenediamine and of adipic acid, with a molecular weight of 10,000 or higher (such as disclosed in U.S. Patent No. 2,130,948, Ex. II) and penetrate to a definite degree the polymeric volume underlining it, but also, as a result of such attack, to produce in the zone of the attacked polyamide mass a menstruum into which the second liquor, carrying with it as solute an agent of desired characteristics, relatively freely diffuses to a finite depth through the attacked surface and into the zone therebelow.

In the two-liquor process above described, the two liquors are each of sufficient viscosity (e.g. 30–200 centipoises) as needed to act as a filler between spaces of the order of 1/16 inch between the surfaces to be joined.

The solute carried by the second liquor in the two-liquor cementing process and by the liquor of the one-liquor process below described is a polyamide capable of developing in its solid state at least the strength of the bond required, generally about 1,000 p.s.i. The solute used in these liquors is of sufficient solubility therein so that the liquor can carry into the space between the surfaces to be joined a sufficient quantity of polymeric material to form on solidifying a relatively solid and homogeneous bond or cement that fills the space between the surfaces to be joined.

In accordance with the invention, varying proportions of the components of the 66/610/6 polyamides may be used as solute in a reactive liquor intended for use as a polyamide cement within the limits of (a) ready solubil-

TABLE I

*Polyamides from hexamethylenediammonium adipate, hexamethylenediammonium sebacate, and epsilon-aminocaproic acid*

| Composition [a] | | | Softening Point, °C. | Modulus of elasticity, lb./sq. in. ×10⁻³ | Solubility in aqueous ethanol |
|---|---|---|---|---|---|
| 66 [b] | 610 [c] | 6 [d] | | | |
| 100 | 0 | 6 | 239 | 104 | |
| 85 | 15 | 0 | 230 | 64 | |
| 70 | 30 | 0 | 210 | 65 | |
| 55 | 45 | 0 | 193 | 66 | |
| 40 | 60 | 0 | 190 | 53 | |
| 25 | 75 | 0 | 185 | 52 | |
| 15 | 85 | 0 | 200 | 75 | |
| 0 | 100 | 0 | 214 | 77 | |
| 0 | 85 | 15 | 181 | 69 | |
| 0 | 75 | 25 | 168 | 52 | |
| 0 | 60 | 40 | 155 | 35 | [e] I |
| 0 | 45 | 55 | 150–182 | 27 | SG 1 |
| 0 | 30 | 70 | 154–188 | 32 | [f] SG 1 |
| 0 | 15 | 85 | 165 | 48 | I |
| 0 | 0 | 100 | 192 | 60 | |
| 5 | 5 | 90 | 181 | 37 | |
| 10 | 75 | 15 | 172 | 48 | |
| 10 | 60 | 30 | 165 | 36 | I |
| 10 | 45 | 45 | 145 | 32 | SG 1 |
| 10 | 30 | 60 | 158 | 30 | SG 45 |
| 10 | 15 | 75 | 173 | 24 | SG 1 |
| 15 | 0 | 85 | 171 | 43 | I |
| 25 | 60 | 15 | 166 | 38 | I |
| 25 | 45 | 30 | 158 | 35 | SG 0.1 |
| 25 | 30 | 45 | 151 | 30 | S |
| 25 | 15 | 60 | 152 | 29 | S |
| 25 | 0 | 75 | 183 | 35 | SG 1 |
| 40 | 45 | 15 | 158 | 45 | I |
| 40 | 30 | 30 | 160 | 32 | SG 1.5 |
| 40 | 15 | 45 | 158 | 37 | S |
| 40 | 0 | 60 | 180 | 39 | S |
| 55 | 30 | 15 | 180 | 51 | I |
| 55 | 15 | 30 | 173 | 39 | SG 0.5 |
| 55 | 0 | 45 | 171 | 33 | SG 20 |
| 70 | 15 | 15 | 190 | 46 | I |
| 70 | 0 | 30 | 190 | 40 | I |
| 85 | 0 | 15 | 215 | 44 | |
| 35 | 45 | 20 | 154 | 32 | I |
| 35 | 40 | 25 | 146 | 32 | [f] SG 0.1 |
| 35 | 35 | 30 | 147 | 29 | SG 0.25 |
| 35 | 30 | 35 | 151 | 31 | SG 1.5 |
| 35 | 25 | 40 | 150 | 27 | SG 20 |
| 35 | 20 | 45 | 155 | 33 | S |
| 40 | 40 | 20 | 156 | 38 | SG 0.05 |
| 40 | 35 | 25 | 151 | 27 | SG 0.5 |
| 40 | 25 | 35 | 150 | 31 | SG 3.0 |
| 40 | 20 | 40 | 146 | 31 | S |
| 45 | 35 | 20 | 162 | 29 | SG 0.1 |
| 45 | 30 | 25 | 163 | 32 | SG 0.25 |
| 45 | 25 | 30 | 163 | 28 | SG 1.5 |
| 45 | 20 | 35 | 162 | 28 | SG 2 |
| 45 | 15 | 40 | 162 | 31 | SG 50 |
| 45 | 10 | 45 | 164 | 32 | SG 50 |
| 50 | 30 | 20 | 169 | 34 | SG 0.1 |
| 50 | 25 | 25 | 169 | 31 | SG 0.33 |
| 50 | 20 | 30 | 166 | 31 | SG 0.5 |
| 50 | 15 | 35 | 169 | 31 | SG 3.5 |
| 50 | 10 | 40 | 168 | 32 | SG 5.0 |
| 55 | 25 | 20 | 176 | 34 | I |
| 55 | 20 | 25 | 177 | 37 | SG 0.05 |
| 55 | 10 | 35 | 173 | 39 | SG 0.5 |
| 60 | 20 | 20 | 185 | 42 | I |
| 60 | 15 | 25 | 192 | 37 | SG 0.1 |
| 60 | 10 | 30 | 188 | 36 | I |
| 65 | 15 | 20 | 205 | | I |
| 65 | 10 | 25 | 228 | | I |

[a] Composition based on percent of polyamide-forming components.
[b] Hexamethylenediammonium adipate.
[c] Hexamethylenediammonium sebacate.
[d] Epsilon-aminocaproic acid.
[e] Insoluble in aqueous ethanol.
[f] Soluble; solution gels in one hour on standing at 25–30° C. The numeral indicates the number of hours elapsed before complete gelation. Absence of a numeral indicates no gelation after extended observation. Amount of solubility is 15% by weight at 50°–75° C. in 80% ethylalcohol.

ity of the overall composition in solvents at convenient working temperatures and (b) the adequately high tensile strength in the solid state. The data given in Table I show how the properties of the various 66/610/6 multi-ingredient copolymeric polyamide compositions vary. For instance, softening points of different 66/610/6 polyamide copolymer compositions vary from 145° C. to 239° C.; their moduli of elasticity or stiffness vary from $27 \times 10^3$ to 114 and $10^3$ lb./sq. in. (as determined on a Tinius Olsen stiffness tester described in Patent 2,049,-235). The solubility range of the various 66/610/6 copolymeric polyamide compositions is illustrated by polymer compositions that are insoluble in aqueous ethanol and those polymers which form 15% solutions in aqueous ethanol and that are stable for 50 hours or more against gelation at 25–30° C.

The above Table I and FIG. 3 are copied from pages 415, 416, and 417 of the Journal of Polymer Science, vol. 2, No. 4 (1947), from an article entitled "Multi-ingredient Polyamides" by Catlin, Czeruin, and Wiley. The data of Table I above are taken from Tables III and IV of the above articles.

The data of Table I are also shown graphically on the ternary diagram FIG. 3. FIG. 3 relates properties to the weight ratios by percent of component used in preparing the polyamides of the invention cement.

In FIG. 3 the numerical expressions 66, 610 and 6 at the apices of the figure denote the number of carbon atoms in the diamine, and the dibasic acid and amino acid components respectively i.e. 66 represents the polymer produced from hexamethylenediammonium adipate, 610 denotes polymers from hexamethylenediammonium sebacate, and 6 denotes polymers from epsilon-aminocaproic acid. The expression 66/610/6 polyamides is used in the present case and claims as generically encompassing all the polyamides produced within the triangular or ternary FIG. 3, by the aforesaid referred to three basic components thereof.

The data plotted in FIG. 3 indicate the gradation of properties with composition of the copolymeric compositions. A contour line represented by the broken line A is drawn through the softening points of 160° C. to indicate the compositions represented with the area F (enclosed by the broken line) which have softening points below 160° C. The contour lines B, C are drawn at a value of $40 \times 10^{-3}$ lb. per sq. in. moduli of stiffness as determined by the Tinius Olsen stiffness tester (Technique of Testing described in U.S. Patent No. 2,285,009; Machine in U.S. Patent No. 2,049,235), and includes the greater portion of the region of 66/610/6 copolymeric compositions having the most pliable compositions. FIG. 3 further indicates the gradation in solubility of these copolymeric polyamide compositions in aqueous 80 ethanol at about 50° C. with change in composition of the copolymer. Certain of these polyamide compositions, for instance, form 15% solutions in hot (50–75° C.) aqueous ethanol, and of these some differ from one another in the time required for gelation of the thus-formed solution at 25° C. FIG. 3 indicates whether a particular polymeric composition is soluble (indicated by the letter S) or insoluble (indicated by the letter I) in the ethyl alcohol solution and, if soluble, the time in hours required for gelation (e.g. G49). The compositions which are soluble to the extent of 15% in 80% aqueous ethanol at 50–75° C. and whose ethanol solutions gel after about one hour at 25–30° C. are connected by contour lines D, E.

Such compositions and compositions of greater solubility are represented by the area on the ternary diagram indicated by G, which area is bonded by lines D, E, and the 66-6 and 610-6 lines. The changes in properties with composition variations are also evident in the data listed in Table I for polymers, which table delineates more precisely the effect of composition in the region of greatest solubility and least stiffness. From these data 66/610/6 polymer compositions can be selected which soften at any particular temperature (e.g. 160° C.), have any degree of stiffness (e.g. $30 \times 10^3$ lbs./sq. in.), are soluble to the extent of 15% by weight in aqueous ethanol and are stable toward gelation for about one hour at 25° C.

In the preferred embodiment of the two-liquor process disclosed hereinafter in Example I below, a copolymeric polyamide from the central portion of the area F on FIG. 3, of a composition as indicated by the point H on that figure is used as solute in the second liquor of the two-liquor process. This copolymeric composition also forms a high concentration solution at 20°–30° C. in liquors, such as those containing formic acid, which, at convenient operating temperatures (e.g. 20°–30° C.), attack the chemically resistant high tensile strength high melting point polymeric bodies, hereinafter called "Nylon 66," such as those formed substantially only of hexamethylene diammonium adipate as by the process of Example II of U.S. Patent No. 2,130,948. This copolymeric composition H when used as a solute in the two-liquor process forms a solid bond of adequate tensile strength. Therefore, such composition is suitable as a solute in the second liquor of the above-described two-liquor process because a sufficient quantity of such high tensile strength polyamide can be carried in an appropriate solvent at convenient operating temperatures to form a thick homogeneous strong bond between adjoining surfaces of such high-tensile strength polyamide bodies as "Nylon 66."

It has also been found that other copolymeric compositions of FIG. 3 which may be used as the solute in the second liquor of the two-liquor process above described are those of which substantial quantities may be carried in solution in commercial solvents, such as low carbon alcohols, which solvents in turn are soluble in liquors, such as phenol or formic acid, which liquors attack high tensile strength, high melting point polyamide materials such as "Nylon 66." The 66/610/6 compositions of such suitable solubility are indicated in area G of FIG. 3. However, those copolymeric 6/610/6 compositions which are also relatively pliable as indicated by a low modulus of elasticity are most suitable for bonding agents because of the capacity of masses of such material to equalize stresses applied thereacross. The preferred range of 66/610/6 compositions of the copolymeric compositions is represented by the points of FIG. 3 encompassed by the broken line A and which points also lie between lines E and D.

An interesting and significant phenomenon observed in the process of forming bonds using as solute in the second liquor compositions chosen from the preferred area in the ternary diagram as above discussed is that the bond formed by the two-liquor process is not attacked by ethyl alcohol. Inasmuch as the components including the 66/610/6 copolymers above described of the first and second liquors are soluble in alcohol, such change in solubility is indicative of a chemical reaction between the heretofore alcohol-soluble components of the first and second liquors and the components of the nylon mass bonded together thereby.

As above set forth, various specific compositions of the copolymers of polymeric amides 66/610/6 may be used as the solutes to form the bonding agents. These compositions are characterized by the features of adequately high tensile strength in this solid state, and adequate solubility in certain above described commercially available organic solvents at convenient operating temperatures (e.g. 20°–30° C.). The physical properties of varying compositions of the useful linear copolymeric polyamide compositions may, within the limitations above set forth, be allowed to vary somewhat depending on the results desired. For differing purposes, somewhat different compositions may be used. For instance where the polyamide bodies to be joined are to be flexed, it is desirable that the bond incorporating the 66/610/6 polyamides modulus of elasticity be approximately the same as that of the bodies to be joined, and a copolymer from FIG. 3 of corresponding properties is, therefore, preferably used. Where the final assembly of bonded elements and bonding composition is to meet thermal conditions that are critical, it is desirable that the bond materials incorporating the 66/610/6 polyamide be chosen with a minimum melting point above that of the temperature which the finished assembly is to meet.

Where processing conditions of maximum allowable processing temperatures are desired, 66/610/6 compositions of adequate solubility at those temperatures may be chosen.

The data set forth in the ternary diagram of FIG. 3 shows the variation of thermal, solubility, and stiffness characteristics of varying compositions of the 66/610/6 polyamide components used, with the intention that one skilled in the art will use the full range of 66/610/6 polyamide compositions of desired solubility, melting points and stiffness characteristics therein encompassed and as characterized by Table I above. These 66/610/6 polyamide compositions are made as described in U.S. Patent No. 2,285,009, and in the "Journal of Polymer Science," vol. 2, 1947, No. 4, pages 418–419, and their manufacture forms no specific part of the present invention which incorporates these in the manner to be fully set forth below.

By the process of the present invention, a range of binding agents is disclosed which may be used with ordinary room (20°–30° C.) temperatures, and not necessarily at high temperatures involving dangerously toxic vapor pressures, and without close machining of the surfaces of the bodies to be joined. Because no high temperatures of the materials treated or the treating materials are required, and because no jigs to hold the work at any substantial pressure are needed, any type of configuration of polyamide masses which may juxtapose may be joined by the invention process and compositions to be described, whose temperature, mechanical, and solubility properties may be varied within substantial limits. These practical advantages have not been disclosed in any prior art, as well as the further advantage of ready obtention of bond strengths in excess of 1,000 p.s.i.

The bond obtained by the processes of this invention is relatively flexible and thus amenable to use for joining flexible bodies. It also has a relatively high melting point for such flexibility.

The second liquor of the above two-liquor process may also carry a solute which imparts a characteristic color or which has some other desirable property, e.g. of affording electrical conductivity or chemical reactivity, to produce thereby a body of the treated polyamide plastic having its surface characteristics altered in a predetermined manner. Generally, the solute or solutes should be less volatile than the solvents so as to remain absorbed by the resin upon removal, as by evaporation, of the solvents.

The function of the solvent in the second liquor of the two-liquor process is to provide a liquor with a solvent that is later readily removable, as by evaporation, in which the solute molecules or supermolecules may dissolve without being destroyed, as by hydrolysis, and freely travel to orient themselves so that their reactive groups may be bound to the free reactive groups of the attacked polyamide. The solute is carried by this solvent evenly and in large concentration throughout the space between the to-be-bound surfaces of the nylon bodies in sufficient quantity to form a firm bond therebetween.

In the two-liquor process the first liquor may consist of or comprise formic acid, a weak dissolving agent for simple polymers, or a corresponding phenol in a sufficient concentration to dissolve at least surface portions of the nylon surfaces which it is desired to bond. In a preferred embodiment, as will be set forth in Example 1, additionally a selected polyamide of the 66/610/6 group is utilized in a moderate percentage by weight with this first attacking or dissolving liquid. The first liquid accordingly effects a priming stage for action thereon by the second liquid. A stabilizer may also be added to the first liquor. The second liquid contains a carrier liquor (or solvent) highly soluble in the first attacking liquor, such as methyl alcohol or other low carbon alcohol as hereinafter disclosed. Carried in solution in said second liquor is a certain proportion of 66/610/6 copolymer chosen from a portion of area F on the ternary diagram above defined. This definition (area F in FIG. 3) of range of compositions is also expressed in terms of materials soluble in a particular ethyl alcohol-water liquid at a particular temperature. Such description is intended as a method of grouping the 66/610/6 copolymer compositions of adequate pliability and solubility. Solvents useful as carriers for a reactive mixture intended for use as a nylon cementing agent also include other carriers than the ethyl alcohol-water mixture at a particular temperature specified for definition purposes. Such other carriers include formic acid, methyl alcohol, and aromatic hydroxy-acids. The second liquor, for reasons above discussed, carries as much copolymer as is compatible with the processing temperature conditions intended (the higher the temperature the more solute is carriable), storage conditions required, (the longer the storage time, the lower the suggested concentration) and the presence or absence of stabilizing agents; where there is a rather voluminous space to fill between the to-be-joined surfaces more concentrated and more viscous liquors are used.

A specific embodiment of the invention for the two-liquor process is set forth in the following illustrative examples.

EXAMPLE I (TWO-LIQUOR PROCESS)

*Step 1—Preparation of first liquor.*—Take 40 grams of comminuted 66/610/6 composition which is composed of 25% by weight of hexamethylene diammonium sebacate, 35% hexamethylene diammonium adipate, and 40% epsilon aminocaproic acid which components are reacted under amide-forming conditions as disclosed in United States Patent 2,285,009. This composition corresponds to a composition at position H of FIG. 3 attached hereto. This material has a melting point of approximately 150° C. and on forming a solution containing 30 parts by weight of such 66/610/6 solute with 70 parts of 95% C.P. methyl alcohol, the pH thereof is 3.2. A composition of multi-ingredient polyamide usable herein is sold under the trademark Zytel 61.

To this 40 grams of 66/610/6 composition add 60 grams of a solution 80% (by weight) of methyl alcohol, 10% methylene chloride, and 10% water. Leave the resultant liquor overnight, during which time the solid polymer used swells and dissolves. To the resultant solution add 900 grams (by weight) of 95% formic acid (C.P.). The formic acid is about 85% by weight in the first liquor thus made.

*Step 2—Preparation of second liquor.*—Add 40 grams of 66/610/6 composition material described in step 1 above to 60 grams of a liquor containing 80% by weight of methyl alcohol, 10% by weight methylene chloride, and 10% by weight of water. On standing at room temperatures (20°–30° C.) for eight hours a solution is formed. Mixing may be used to accelerate the formation of this solution. To the solution thus formed add 40 grams of 95% formic acid (C.P.). The resultant liquor is the second liquor.

*Step 3—Conditioning of the nylon bodies to be joined.*—The first liquor is used as a primer on the surface of the nylon body to be joined to another nylon body.

For purposes of this example, two rigid, molded slabs of a high tensile strength polyamide or nylon of high melting point composed of polymers of hexamethylene diammonium adipate formed as disclosed in the referred-to Patent No. 2,130,948 are the treated polyamide bodies. FIG. 1 shows slabs 11 and 12 to be joined along contiguous surfaces 13.

The first liquor is applied to each of the opposing nylon surfaces of slabs 11 and 12 which it is desired to bond. The "first liquor" is allowed to remain in contact with each nylon surface while exposed to air at room temperature for a few (e.g. 2–10) minutes, or until the solvent of the first liquor is largely evaporated. There result surface layers on slabs 11, 12 which are relatively rough though solid and soft. Such consistency may be reached more rapidly by allowing the "first liquor" to act on the nylon surface at a temperature slightly above room temperature, e.g. 60° C.

*Step 4—Application of the second liquor.*—After the first surface has thus been made permeable to the second liquor, the second liquor is spread over the permeable surface produced by the first liquor (step 3 above) in an amount in excess of that immediately absorbed thereby. In about 10 minutes the resulting surface becomes tacky.

*Step 5—Contact step.*—The surfaces to be bonded are then pressed together lightly (at 1 to 5 p.s.i.) to secure a uniform and continuous contact.

A firm bond developing about 1000 p.s.i. shear strength develops (see Table II below) at room temperature, on permitting the thus-treated surfaces to remain in contact for about eight hours. By the use of elevated temperature, e.g. 60° C., substantially full strength is developed in about one-half hour.

Other low-carbon alcohol, such as ethyl or propyl alcohol may be used in place of methyl alcohol in both liquors. However, the lower the volatility of the solvent, the higher the temperature of curing. Other solvents which attack and slightly hydrolyze nylons without destroying the polymeric chains, such as cresol or phenol, may be used in place of formic acid in the first liquor. However, formic acid has a greater chemical action on the nylon bodies at lower temperatures, such as at 20–30° C., and at such temperatures its volatility does not adversely affect the time which a solution thereof requires for its action on the polyamide surface in contact therewith.

Whereas the second liquor in the above example forms an adequate bond, it has been found that the addition of more water to each 100 grams of second liquor decreases the rate of evaporation of the solvent from the second liquor in contact with the attacked surface and thereby increases the time for the components of the second liquor to penetrate and permeate the phase formed by the action of the first liquor on the polyamide solid phase. Thereby more complete penetration and permeation and a stronger mechanical bond are provided.

When colder temperatures are used or when operating in excessively humid atmospheres, the amount of water in the second solution may be reduced or eliminated, so that the time required for forming a full-strength bond about 25° C. is about 8 hours.

Also, further addition to the second liquor of sufficient adipic acid or benzoic acid or boric acid to provide 2% by weight thereof in the second liquor provides a further increase in the strength of the bond between two nylon surfaces joined by the process of Example I above.

The second liquor in the above example, consisting of polyamide, alcohol and water, is normally stable for three to four hours even without the chloride, after which time some clouding and phase separation is usually observed. The storage time can be lengthened, however, by the use of a suitable stabilizing agent. Chlorinated hydrocarbons such as methylene chloride or ethylene chlorohydrin are satisfactory stabilizers. Admixture of 10 parts by weight of methylene chloride with 100 parts by weight of the second liquor will increase its permissible storage time to one week at least.

In a further embodiment of the invention as applied to form bonds between high tensile strength nylon masses a single liquor is used; this is below referred to as the "one-liquor process." The liquor here used has the capacity to attack the surface zones of a solid polyamide body to be bonded to another similar body while carrying a solute which, on solidifying, has a high tensile strength and forms a firm bond with the material of the polyamide body.

The two liquors of the two-liquor process can be combined into one three-component liquor to give a one-liquor process which is as effective as the two-liquor process, hereinabove described, for most commercial applications. The one-liquor process contains as one component a first liquid agent that attacks the polyamide surfaces to be treated; a second component which is a bond-forming solute; and a third component which is a liquor that acts as a carrier for the bond-forming solute and is highly soluble in the first component.

The first component provides a medium having definite solution effects on the polyamide surfaces to be bonded. The action of this agent on the surfaces treated provides a menstruum into which the bond-forming solute molecules freely travel, carried in the third component. The third component is soluble in the first component and has the capacity to hold the bonding agent in solution phase as a solute at 20°–30° C. in an amount sufficiently large to form, on reacting with the polyamide surface to be bonded and/or on solidifying, a rigid bond of adequate tensile and/or shear strength.

In the one-liquor process the concentrations of the solution components must also be chosen so that the first component, such as phenol or formic acid, that acts as an attacking agent on the polyamide, such as Nylon 66, which is to be bonded must be in a sufficiently high concentration to act on that polyamide satisfactorily at the temperatures that are convenient and within the times that are economical. However, such component must not be in such a high concentration as to hydrolyze the solute which is intended to serve as a bonding agent to such a degree as will vitiate the advantage of a high concentration of such solute in this one liquor.

The amount of the third component, such as methyl alcohol, which dissolves the bond-forming solute and does not hydrolyze it, is chosen and used in such quantity so that at least sufficient of the bond forming solute will be carried in solution to provide an effective bond on solidifying. No greater amounts of such third component are used, however, than needed for such purpose in order to insure that there will be no undesirable degree of influence by the third component—as by dilution—on the action of the first component, such as formic acid, which attacks the polyamide surface, to be bonded.

The considerations above discussed, e.g. the necessity of high concentration of suitable solute at convenient operating temperatures (20°–30° C.) and high molecular weight and high tensile strength thereof that lead to the choice of the 66/610/6 copolymers represented in area F of FIG. 3 for use as the solute in the second liquor of the two-liquor process apply also to the choice of that copolymer as a binding agent-producing solute in this one-liquor process. Similarly, the conditions of use of product and permissible processing temperatures which permit some variations in the concentration of solute of the second liquor and in the composition of the copolymer solute in the two-liquor process apply to the solute concentration and compositions and to the use of stabilizers in the one-liquor process as well.

EXAMPLE II.—ONE-LIQUID PROCESS

*Step 1.*—Two ½ in. x 5 in. x 3/16 in. nylon slabs of the same composition as treated in Example I are each treated with a rasp to roughen a portion of a ½ in. x 5 in. face on each slab.

*Step 2.*—A liquor of about 34 centipoises viscosity at

25° C. is prepared by dissolving 48 grams of an alcohol soluble 66/610/6 polyamide of the same composition as used in Examples I and II above (composition represented by point H on FIG. 3) in 120 grams of a solution containing 70 grams of 95% methyl alcohol, 30 grams of 90% formic acid, 10 grams of water, and 10 grams of methylene chloride. The resulting solution is the one liquor of the one-liquor process. The liquor is spread over the roughened surfaces produced by step 1 in an amount in excess of that immediately absorbed absesses-absorbed thereby. In about 10 minutes the resulting surface becomes tacky. A second roughened nylon surface is similarly treated.

*Step 3.*—The surfaces to be bonded together are then pressed together with a slight pressure of about 5 p.s.i. (a range of 1 to 10 p.s.i. is satisfactory). A firm bond developing about 800 p.s.i. tensile strength develops on permitting the thus treated surfaces to remain in contact for about eight hours at room temperature. By the use of elevated temperatures, e.g. 60° C., substantially full strength is developed in about one-half hour.

The substitutions and changes recited above in connection with the second liquor of Example I are applicable to these constitutents of Example II where longer reaction times or higher temperatures are required in proportions and in directions as above discussed in connection with liquor 2 of Example I.

In FIG. 1, two slabs 11 and 12 of composition as disclosed in Example I, are shown joined by a bond 13, forming a lap joint. The bond may be formed by the process of Example I or by the process of Example II.

FIGS. 1 and 2 are given purely for illustrative purposes; of course, other types of joints and non-uniform surfaces are readily bonded by the invention compositions and processes. It should be understood that no close machining or high temperatures or high pressure are needed while the bonding liquors used in Example I or II are solidifying. Data on the strength obtained by the bonds produced by the process of Examples I and II are tabulated in Table II below:

of interlaced polyamide yarns or fibres, perhaps held in a frame. The liquor is preferably applied by brush, or may be applied by dipping the work in a bath of such liquor, or the liquor may be sprayed on the mass of interlaced fibres. The two-liquor process may be similarly applied to such work, thereby a nylon net or felting is readily made.

In the cementing processes above described, an explanation thereof was advanced. This explanation involved the theory that the action of the formic acid containing liquor used as a primer in the two-liquor process provided a menstruum into which the second liquor, carrying a high concentration of bond-forming material, could freely diffuse. The second liquor, according to this theory, was one able to carry in solution a large amount of bond-forming material without destruction thereof and was able to diffuse through the menstruum prepared by the action of the first liquor, carrying with it the bond-forming material in high concentration. The nylon slab treated is disclosed as formed with an excess of amine material and the 66/610/6 polymeric material had an acidic pH reaction in excess of that of the alcohol-water solution in which dissolved. Therefore, it is consistent to believe that a chemical reaction occurred between the relatively basic treated slabs (presumably containing an excess of free amine groups) and the relatively acidic component (presumably containing an excess of unreacted carboxyl groups) of the 66/610/6 composition. The change in solubility of the finished bond relative to the solubility of the components of the bond is consistent with such a chemical interaction consuming formerly present reactive components. On the basis that the nylon surface "opened" by the action of the formic acid-containing liquor would also be permeable to solutions containing other solutes than bridge-forming or bond-forming components, I have applied dyes stable in solvents which are soluble in solvents for nylon fabrics without using as solvent for such dyes the highly destructive and reactive liquors needed to attack nylon as a carrier for such dyes.

TABLE II

*Strength test data on bonds developed by processes of Examples I and II*

DOUBLE LAP JOINT

| Product of Example No. | I | I | I | II | II | II |
|---|---|---|---|---|---|---|
| Cross-Sectional Dimensions (in.) | .51 x .24 | .50 x .26 | .52 x .23 | .62 x .24 | .16 x .23 | .52 x .25 |
| Area (Sq. in.) | .122 | .130 | .120 | .149 | .140 | .130 |
| Maximum Breaking Load (Lbs.) | 291 | 198 | 162 | 200 | 210 | 218 |
| Shearing Stress (p.s.i.) | 1,190 | 766 | 675 | 807 | 750 | 839 |

BUTT JOINT

| Product of Example No. | I | I | I | II | II | II |
|---|---|---|---|---|---|---|
| Cross-Sectional Dimensions (in.) | .23 x .14 | .27 x .12 | .27 x .13 | .28 x .13 | .27 x .12 | .28 x .13 |
| Area (Sq. in.) | .0322 | .0324 | .0351 | .0364 | .0324 | .0364 |
| Maximum Breaking Load (Lbs.) | 40.0 | 36.5 | 48.0 | 9.0 | 6.0 | 6.0 |
| Tensile Strength (p.s.i.) | 1,240 | 1,130 | 1,370 | 247.5 | 185 | 165 |

The bonding process above described is, of course, applicable to polyamides in other forms than in slabs, e.g. to fibres, yarns, and netting, in flexible as well as rigid form. For instance, the one liquor of the one-liquor process of Example II above may be applied to a group I have used as a carrier for the dye a solvent whose only requisite is that the carrier be soluble in the liquor which attacks the nylon, rather than that the dye be soluble in the liquid which attacks the nylon. Thereby I have applied dyes to nylon. The surface coloring thereby produced is water-fast, soap-fast and bright and deep in color. Specific embodiments of the procedure for dyeing nylon are now given in detail.

EXAMPLE III

Step 1.—A smooth surfaced nylon slab of the same shape and composition as that in Example I is treated as described in the first step and third steps of Example I with a liquid of the composition of the "first liquor" there described.

Step 2.—A dye soluble in alcohol and not precipitated by formic acid, such as a mixture of amino-diphenyldiamino-, triphenyl-triamino-, and tetraphenyl-tetraaminophenyl-diphenazonium chloride (known as "Fast Blue B" No. 860 in the Colour Index, edited by Rowe, June 1924, Society of Dyers and Colorists, Manchester England, copy in Public Library at 5th Avenue and 42nd Street, New York City), is dissolved in ethyl alcohol, and the solution thereby formed is added in about 0.1% concentration (by weight) to the previously swollen and softened surface in an amount slightly in excess of that needed to permeate the surface. The thus-treated nylon slab is permitted to dry at room temperature for several hours. There results a brilliant blue surface which has the smooth texture of nylon slab and is unaffected by immersion in and washing with hot soap and water. Other similar dyes may of course be used.

EXAMPLE IV

A woven nylon cloth is printed by the process of Example III i.e. by a preliminary treatment of the cloth (the fibres of which are formed Nylon 66 yarn as in steps 1 and 3 of Example I, followed by a wetting of fibres, while in a permeable condition, with a second liquor as in the second step of Example III. The carrying liquor may be conveniently applied to the fabric by patterned rollers.

A dye of the above character and also Luxol Fast Blue AR (Du Pont) may be dissolved directly in formic acid-methyl alcohol (10:90) mixture and the nylon fabric dipped in it. In a manner similar to the procedure of permeating the zone of the nylon surface treated by the first liquor of the two-liquor process with a second liquor soluble in the attacking liquor, which second liquor may carry a dye, I have also used the first liquor to provide a menstruum for a second liquor, which second liquor is a carrier of a chemically reactive material. Deposition of this chemically reactive material in the permeated treated nylon surface gives such treated surface the characteristics of the permeating material. Thereby a variety of characteristics may be given the otherwise chemically inert surfaces of the high tensile strength, high molecular weight polyamides such as "Nylon 66" above described. In the following Examples V and VI, I give the nylon surface characteristics of an aldehyde; this thus-formed surface is then reacted with a reducible metal to metallize the surface; this metallization is increased by electrodeposition; the electrodeposited surface may then be protected from oxidation or mechanical damage by coating the entire surface with a transparent thin protective covering of adherent polyamide material.

EXAMPLE V

Step 1.—A slab of nylon of the same composition and dimensions as in Example I is immersed in a 80–90% formic acid solution (10–20% water) for 20 minutes then removed and permitted to partially dry.

Step 2.—A thus-treated surface of the slab is then treated with a solution containing 20 parts by weight of acetaldehyde in about 70 parts by weight of formic acid for about 10 minutes, and then allowed to dry to a tacky condition.

Step 3.—While the thus-treated surface is still tacky, the treated slab is dipped into a freshly prepared aqueous solution of 5% $AgNO_3$ which has been ammoniated to a clear condition and contains a trace of alkali (Tollen's reagent). Contact of this ammoniacal silver solution and the slab is permitted for 1–5 minutes. The slab is withdrawn and washed and has a conductive silver coating thereon.

EXAMPLE VI

The same as Example V except that an aqueous liquor prepared by mixing one part of a solution containing five parts by weight of copper acetate in 100 parts by weight of ethyl alcohol is substituted for the Tollen's reagent in step 3 and the slab and liquor are warmed to about 80° C. together. A conductive copper-containing layer is thereby produced on the nylon slab.

In place of acetaldehyde, one can also use formaldehyde in step 2 of Examples V and VI, especially in presence of means for inhibiting the evaporation of the formaldehyde—such as treatment in an autoclave.

The conductive surface produced by Example V and VI may be further metallized. This is accomplished by using such coated surface as is produced by Examples V and VI as an electrode and electro-depositing thereon a metallic coating. This coating may be arranged in any pattern by masking off areas other than those upon which metal deposition is desired. Different areas may receive electro-deposits of different metals. After the metallic layer has been formed, the nylon cloth or fibres or other polyamide surface may be treated as in step 2 of Example II to thereby provide a layer of polyamide to protect the thus-deposited metal from corrosion.

The control of the polyamide molecular weight and/or viscosity is conventionally accomplished by employing a slight molar excess of diamine or dibasic acid (as described in U.S. Patent No. 2,174,527 and in "Preparation of Polymeric Amides From Diamines and Dibasic Acids," by Beerchet et al., J. Polymer Sci., vol. 2, No. 3 (1947), p. 309). While the determination of the amount and polarity of the end-groups may be difficult where the composition of the polyamides treated is not known, an empirical test is that: If the bonds between the polyamides by the process of Example I is not as firm as desired, assume that the excess end-groups in the bond-forming polyamide (such as the material indicated by H in FIG. 3, which material is hereinafter referred to as the "H-material"), are of the same polarity as in the treated surface. The procedure of Example VII below compensates for the situation where the polarities are the same.

Example VII below is, further, illustrative of the process of providing a menstruum by the action of a first liquor in a two-liquor process (Example I), on the surface of a polyamide of high tensile strength such as a Nylon 66 as above described, and thereafter carrying into that menstruum an agent that reacts with the free reactive groups in the surface of the thus-treated polyamide of high tensile strength.

The process and product of the modification described below in Example VII is especially useful when the treated polyamide body as well as the 66/610/6 polymer contains an excess of carboxyl groups. It is also applicable when the polyamide body treated as well as the 66/610/6 polymer contains an excess of amine groups.

The situation of bonding polyamide bodies by a bonding agent which may contain an excess of free reactive end-groups as in the to-be-bonded polyamide body is met by my discovery that di-isocyanates may be used as an addition to the second liquor of the two-liquor process above described in Example I. Di-isocyanates may also be used as an addition to the one liquor of the one-liquor process above described in Example II. These isocyanates react with amine and with carboxyl end-groups found in the surface zones of the nylon bodies treated either by the first liquor of the two-liquor process or by the attacking component of the one-liquor process. These diisocyanates thereby link the molecular chains attached to these excess carboxyl or amine groups in the to-be-bound polyamide body with the molecular chains holding the excess carboxyl or amine groups in the bond-forming polyamide material (e.g. "H-material"). There may also be similar reaction with the free end-groups which are not in excess.

The diisocyanates also appear to cross-link the polymeric chains in the bond formed by the material indicated by H in FIG. 3.

EXAMPLE VII.—MODIFIED TWO-LIQUOR PROCESS

*Step 1.*—This is exactly the same as step 1 of Example I above, resulting in the first liquor.

*Step 2.*—The entire procedure of step 2 of Example I is followed. The product of step 2 (i.e. the approximately 140 grams of resultant liquor which is the "second liquor"), is then further treated by the addition thereto of 15 cc. of a diisocyanate solution consisting essentially of 60% by weight of 2,4-tolylene diisocyanate (represented by the graphic formula:

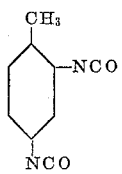

and 40% by weight of orthodichlorbenzene). This diisocyanate may contain a few percent of the 2,6-isomer. The diisocyanate containing liquor is added slowly to the "second liquor" in order that the exothermic heat of reaction which follows the addition will be dissipated without such an appreciable rise in temperature as will drive off the more volatile solvents and constituents, while mixing to produce a homogeneous liquor. Maintenance of a temperature below 40° C. is desirable and relatively simply obtained by air-cooling and slow addition. The liquor so produced is a homogeneous solution usually stable against gelation at least eight hours at room temperatures (20°–30° C.) and is referred to hereinafter as "the modified second liquor."

*Step 3.*—This step is the same as step 3 of Example I. However in this procedure the polyamide slab used is a polymer of hexamethylene diammonium adipate that contains an excess of free carboxyl radicals.

*Step 4.*—Same as step 4 of Example I. However, it is preferable that with a diisocyanate in the "modified second liquor" it be used within a short period after its completion by addition of the diisocyanate solution thereto; e.g. within three hours, with the concentration thereof in this Example VII.

*Step 5.*—Same as step 5 of Example I; here however, heat at 40°–50° C. is advisable for the purpose of forming a bond within a few hours. At lower temperatures the time for formation of a bond is correspondingly longer.

While in the preferred embodiment I add as an agent 2,4-tolylene diisocyanate (which may contain about 2% of the 2,5-isomer) to the "second liquor," in a concentration of about 5 per centum by weight I may also use p,p'-diphenylmethane diisocyanate (represented by the graphic formula

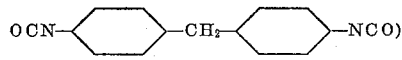

or I may use p,p',p''-triphenylmethane triisocyanate, represented by the graphic formula

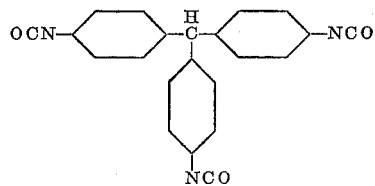

The melting points of these compounds are above 30° C; they may be used in solution, such as solutions of chlorinated hydrocarbons, e.g. methylene dichloride. The diisocyanate concentration may be varied, for instance, between 1% and 10% by weight in the "modified second liquor." At the lower concentrations the stability of the "modified second liquor" is greater; at the higher concentrations the strength of the resultant bond is increased.

The diisocyanates appear to act as reactants with the reactive groups in the surface zones of the polyamide bodies treated—and thereby "opened"—by the first liquor. The nuclei to which the isocyanate groups are attached in the diisocyanate molecules used appear then to serve as links between (*a*) the remainders of those molecular chains attached to the above-mentioned reactive groups in the surface zones of the polyamide body treated and (*b*) the molecular chains attached to the free reactive end-groups in the bond-forming "H-material" carried in the "modified second liquor."

The diisocyanates have been disclosed in the above Example VII for use in treating a polyamide body wherein the excess of reactive end-groups is of the same polarity as that of the excess of reactive end-groups in the "H-material" used. However the diisocyanates may be added as above disclosed and used for the treatment of (*a*) a polyamide body containing an excess of amine end-groups as is used in Example I, by (*b*) the first and second liquors disclosed in Example VII wherein the "H-material" contains an excess of carboxyl end-groups and also the second liquor used contains the diisocyanate.

The diisocyanate also appears to act as a cross-linking agent in the polymeric 66/610/6 mass which is the residue after evaporation of the solvents in the first and second liquor. This cross-linking effect is evidenced by an increase in strength of the bond formed by bonding solutions containing the diisocyanates over the strength of the bonds formed by the second liquors without the addition of the diisocyanates.

The variations in the components of the "second liquor" such as the amount of water, amount and type of alcohols or polyamide-attacking agents, and amount and type of chlorinated hydrocarbons and multi-ingredient solute discussed above in connection with Example I are permissible with the "modified second liquor" used in Example VII.

Further, the above-mentioned polyisocyanates may be added to the liquor used in the "one-liquor process" of Example II. In such a case the poly-isocyanate is added to the liquid suitable for use in the process of Example II in the same manner as the diisocyanate was added in Example VII (step 2) to a liquor of composition corresponding to the "second liquor" of Example I. The polyisocyanate may be added as a solution, e.g., 60% by weight tolylene diisocyanate, 40% by weight orthodichlorobenzene. Thereby, for instance, a liquor containing 48 grams of an alcohol-soluble 66/610/6 polyamide of the composition represented by point H on FIG. 3; 70 grams of 95% methyl alcohol; 30 grams of 90% formic acid; 5 grams of methylene chloride; 6 grams of tolylene diisocyanate (2,4-isomer about 98%; 2,6-isomer about 2%) and 4 grams orthodichlorobenzene is produced.

This may be used as the one liquor in the process of Example II to bond polyamide bodies having excess end-groups of the same as or different polarities from the polarity of the end groups in excess in the multi-ingredient polyamide.

Although the present invention has been set forth with preferred processes, procedures and liquor embodiments, it is to be understood that equivalents and variations may be made and practiced without departing from the broader spirit and scope of the present invention not affected by any theory or explanation hereinabove made except as defined in the appended claims.

I claim:

1. A process for bonding polyamide bodies of high molecular weight, comprising the steps of treating a surface of each of said bodies with a liquor containing a multi-ingredient copolymer of hexamethylenediammonium adipate, hexamethylenediammonium sebacate, and epsilon-aminocaproic acid, a first liquid material which is a solvent for the polyamide bodies, and a second liquid material which is a solvent for the multi-ingredient polyamide and a cross-linking agent for said copolymer chosen from the group which consists of diisocyanates and triisocyanates.

2. A reactive mixture for joining polyamide bodies, comprising a solvent for polyamide bodies of high molecular weight and, dissolved in said solvent, a multi-ingredient low-molecular-weight copolymeric polyamide soluble in 8:20 ethyl-alcohol:water solution to the extent of substantially 15% by weight at 50°–75° C., said low-molecular-weight polyamide being a copolymer of hexamethylenediammonium adipate, hexamethylenediammonium sebacate, and epsilon-aminocaproic acid, a component which is soluble in said polyamide solvent and which is also capable of dissolving said multi-ingredient polyamide without substantial hydrolysis thereof, and a polyisocyanate chosen from the group which consists of diisocyanates and triisocyanates.

3. A reactive mixture for joining polyamide bodies comprising a solvent for polyamide bodies of high molecular weight and, dissolved in said solvent, a multi-ingredient copolymeric polyamide of low molecular weight soluble in 80:20 ethyl-alcohol:water solution to the extent of substantially 15% by weight at 50°–75° C., a compound which is soluble in said polyamide solvent and which is also capable of dissolving said multi-ingredient polyamide without subtsantial hydrolysis thereof, and a polyisocyanate chosen from the group which consists of diisocyanates and triisocyanates.

4. A product of the character described comprising two polyamide bodies composed essentially of high-molecular-weight polymers of hexamethylene diammonium adipate, and an adhesive between and joining said bodies which is composed in major part of a low-molecular-weight copolymeric material containing, per each 100 parts thereof, between 5 and 45 parts of hexamethylenediammonium adipate, between 20 and 65 parts of epsilon aminocaproic acid, between 10 and 55 parts of hexamethylenediammonium sebacate, and 1 to 10 parts of a cross-linking agent chosen from the group which consists of diisocyanates and triisocyanates.

References Cited in the file of this patent

UNITED STATES PATENTS

| | | |
|---|---|---|
| 2,153,660 | Clapp | Apr. 11, 1939 |
| 2,180,723 | Schur et al. | Nov. 21, 1939 |
| 2,333,914 | Berchet | Nov. 9, 1943 |
| 2,333,917 | Christ et al. | Nov. 9, 1943 |
| 2,402,021 | Compton | June 11, 1946 |
| 2,542,288 | Pickens | Feb. 20, 1951 |
| 2,561,449 | Ruderman | July 24, 1951 |
| 2,610,927 | Foulds | Sept. 16, 1952 |
| 2,691,639 | Roth | Oct. 12, 1954 |
| 2,752,320 | De Witt | June 26, 1956 |
| 2,762,735 | Werner et al. | Sept. 11, 1956 |

FOREIGN PATENTS

| | | |
|---|---|---|
| 594,075 | Great Britain | Nov. 3, 1947 |